US006853959B2

(12) United States Patent
Ikeda et al.

(10) Patent No.: US 6,853,959 B2
(45) Date of Patent: Feb. 8, 2005

(54) REMOTE MONITORING DIAGNOSTIC SYSTEM AND METHOD THEREOF

(75) Inventors: Hiraku Ikeda, Hitachinaka (JP); Zenji Yamaguchi, Hitachi (JP); Akiyo Ichihashi, Hitachi (JP); Akira Okabe, Hitachi (JP)

(73) Assignees: Hitachi, Ltd., Tokyo (JP); Hitachi Engineering & Services Co., Ltd., Ibaraki (JP)

( * ) Notice: Subject to any disclaimer, the term of this patent is extended or adjusted under 35 U.S.C. 154(b) by 0 days.

(21) Appl. No.: 09/791,692

(22) Filed: Feb. 26, 2001

(65) Prior Publication Data

US 2001/0056335 A1 Dec. 27, 2001

(30) Foreign Application Priority Data

Jun. 22, 2000 (JP) .......................................... 2000-192650

(51) Int. Cl.[7] .............................................. G06F 19/00
(52) U.S. Cl. ........................ 702/188; 702/183; 702/185; 701/100
(58) Field of Search ........................... 60/772, 773, 777, 60/779, 783, 281, 288, 39.091, 286, 278; 374/144; 415/118, 17, 1; 416/61; 701/100; 714/25, 26; 702/130, 132, 136, 138, 140, 188, 62, 122, 113–115, 179–181, 182–187, FOR 103, FOR 104, FOR 106, FOR 111, FOR 123, FOR 124, FOR 134, FOR 135, FOR 139, FOR 170, FOR 171, 56; 123/435, 672, 674, 676, 679, 406.26–406.28; 700/286, 287, 290; 705/412; 340/870.01, 870.02, 870.16, 679, 3.1, 3.43, 3.44, 286.01; 376/215–217; 379/100.08, 106.01, 106.03; 706/904, 906, 907, 912, 914, 915; 345/965, 969, 970

(56) References Cited

U.S. PATENT DOCUMENTS

| | | | | |
|---|---|---|---|---|
| 4,383,298 A | | 5/1983 | Huff et al. ..................... 705/28 |
| 4,908,746 A | | 3/1990 | Vaughn ....................... 700/18 |
| 5,311,562 A | | 5/1994 | Palusamy et al. ........... 376/215 |
| 5,452,218 A | | 9/1995 | Tucker et al. ............... 700/110 |
| 5,566,092 A | | 10/1996 | Wang et al. ................. 702/185 |
| 5,596,712 A | | 1/1997 | Tsuyama et al. .............. 774/26 |
| 5,940,300 A | | 8/1999 | Ozaki ......................... 700/121 |
| 6,006,171 A | * | 12/1999 | Vines et al. ................. 702/184 |
| 6,147,601 A | * | 11/2000 | Sandelman et al. ......... 340/506 |
| 6,298,308 B1 | * | 10/2001 | Reid et al. .................... 702/56 |
| 6,415,395 B1 | * | 7/2002 | Varma et al. ................. 714/37 |
| 6,473,659 B1 | * | 10/2002 | Shah et al. ................... 700/79 |
| 6,499,114 B1 | * | 12/2002 | Almstead et al. ............. 714/25 |

FOREIGN PATENT DOCUMENTS

| | | |
|---|---|---|
| JP | 3-142322 | 6/1991 |
| JP | 6-307897 | 11/1994 |

* cited by examiner

*Primary Examiner*—Hal Wachsman
(74) *Attorney, Agent, or Firm*—Mattingly, Stanger & Malur, P.C.

(57) ABSTRACT

The present invention comprises a data storage file used to collect the plant data representing the operation status of a plant and to store the plant data, a monitoring system to monitor the field plant according to the collected plant data, a database storing the past plant data associated with errors having occurred to the plant and actions taken to cope with the errors, a diagnostic system to analyze the plant data sent according to the database, and a reporting system to send a report to the user of the plant regarding the causes for the error and/or actions taken to cope with the error based on the result of the analysis.

12 Claims, 9 Drawing Sheets

REMOTE MONITORING DIAGNOSTIC SYSTEM AND METHOD THEREOF

BACKGROUND OF THE INVENTION

Field of the Invention

The present invention relates to the remote monitoring diagnostic system and remote monitoring diagnostic method for providing centralized remote monitoring of multiple plants including thermal and hydraulic power plants and for diagnosing errors.

In the event of a trouble having occurred to the power plant, manufacturers have dispatched engineers to the field to provide a direct instruction, supervision, inspection and evaluation and to take actions to solve the problem. When multiple facilities are located in one and the same field, supervisors have been sent according to the number of the facilities. If there is a sign of causing an error in the normal operation mode (not an actual error) and the judgment on the phenomenon cannot be passed, the manufacturer's supervisor have sent the data on the phenomenon, past records and inspection results by fax or mail to the head office of the manufacturer, and have got the result of evaluation by telephone, fax or mail to purchase the repair and replacement components, thereby solving the problem in the event of a trouble so far.

As described above, earlier solution of the problem by monitoring of facility errors and symptom diagnosis by the user and manufacturer has depended on oral replies or fax replies of the user operator and maintenance personnel. So much time has been required to pick up the results of detailed analysis. Much time has also been used to prepare (list up) the component and tools required for problem solution. This has made it necessary to improve the availability factor of the facilities by reduction of problem solution time.

SUMMARY OF THE INVENTION

The object of the present invention is to provide the remote monitoring diagnostic system and remote monitoring diagnostic method that improves the availability factor of the plant.

To achieve the above object, the remote monitoring diagnostic system according to the present invention comprises a data storage file used to collect the plant data representing the operation status of a plant and to store said plant data, a monitoring system to monitor said field plant according to said collected plant data, a database storing the past plant data associated with errors having occurred to said plant and actions taken to cope with said errors, a diagnostic system to analyze said plant data sent according to said database, and a reporting system to send a report to the user of said plant regarding the causes for the error and/or actions taken to cope with the error based on the result of said analysis.

Furthermore, a remote monitoring diagnostic method according to the present invention comprising the steps wherein the plant is monitored by the plant monitoring system installed in the plant, the plant data representing the operation status of said plant is collected, information on the occurrence of an error given from said plant monitoring system and said collected plant data associated with the error are sent to the remote monitoring diagnostic center located away from said plant when an error has occurred to said plant, said sent plant data is analyzed at said monitoring and diagnostic center according to the database storing the past plant data associated with errors having occurred and actions taken to cope with said errors, and the causes for the error and/or actions taken to cope with the error are reported to the user of said plant based on the result of said analysis.

BRIEF DESCRIPTION OF THE DRAWINGS

FIGS. 7-1 and 7-2 are a drawings outlining the work performed by the personnel in the remote monitoring diagnostic center and the product department.

DETAILED DESCRIPTION OF PREFERRED EMBODIMENTS

Figure 1:
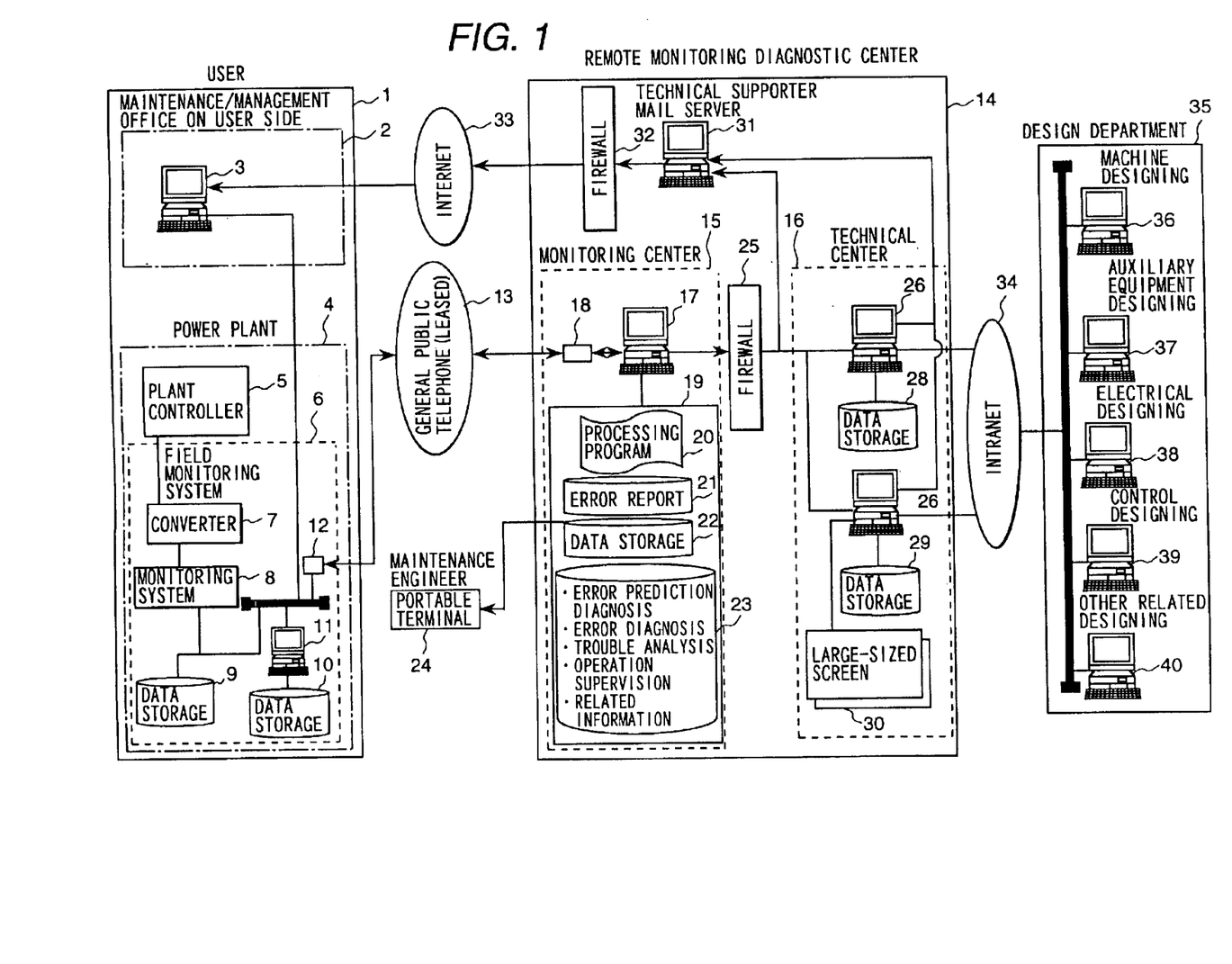
FIG. 1 is a system configuration representing a remote monitoring diagnostic system as one embodiment of the present invention.
Figure 2:
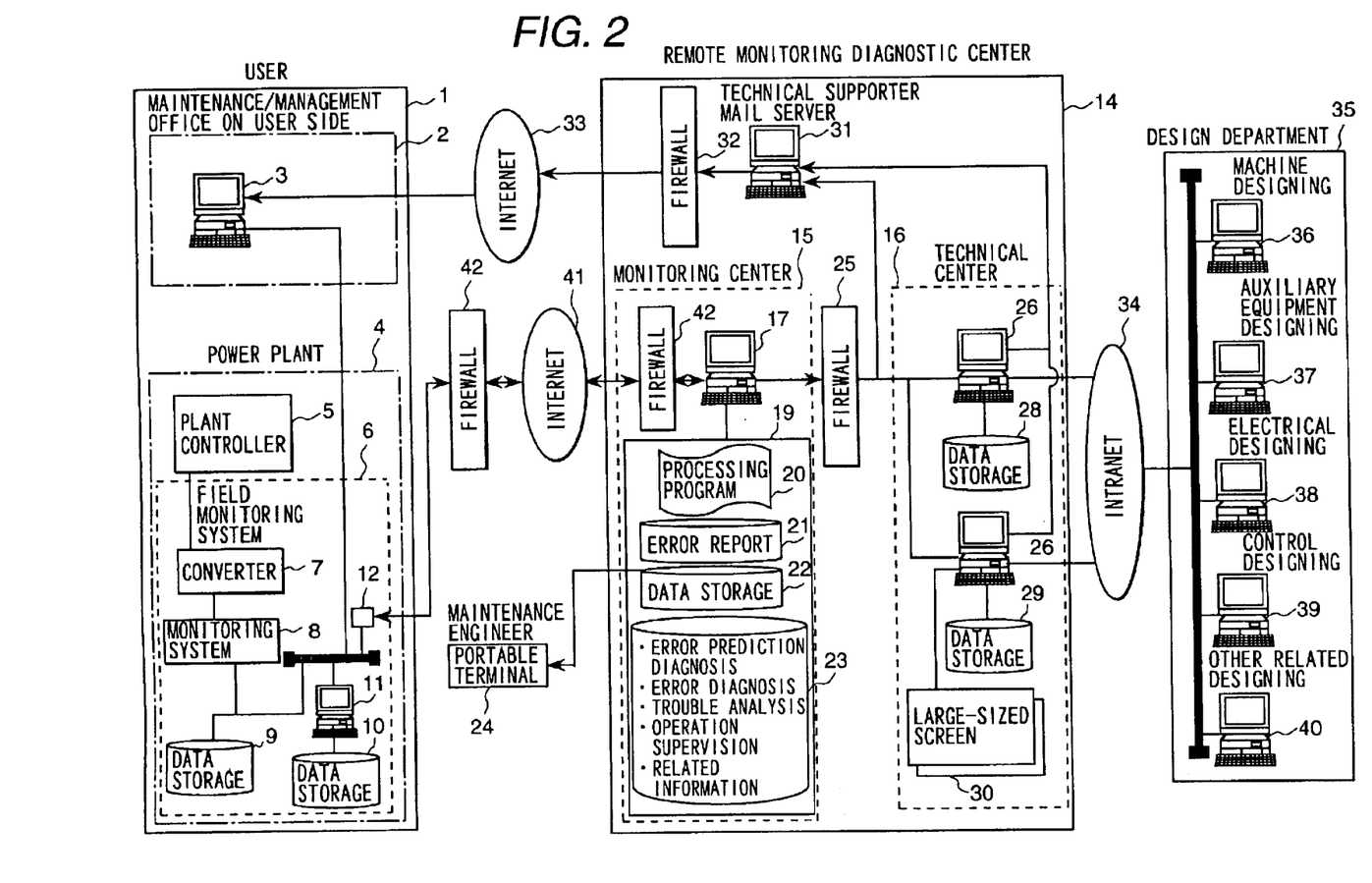
FIG. 2 is a system configuration representing a remote monitoring diagnostic system as another embodiment of the present invention.
Figure 3:
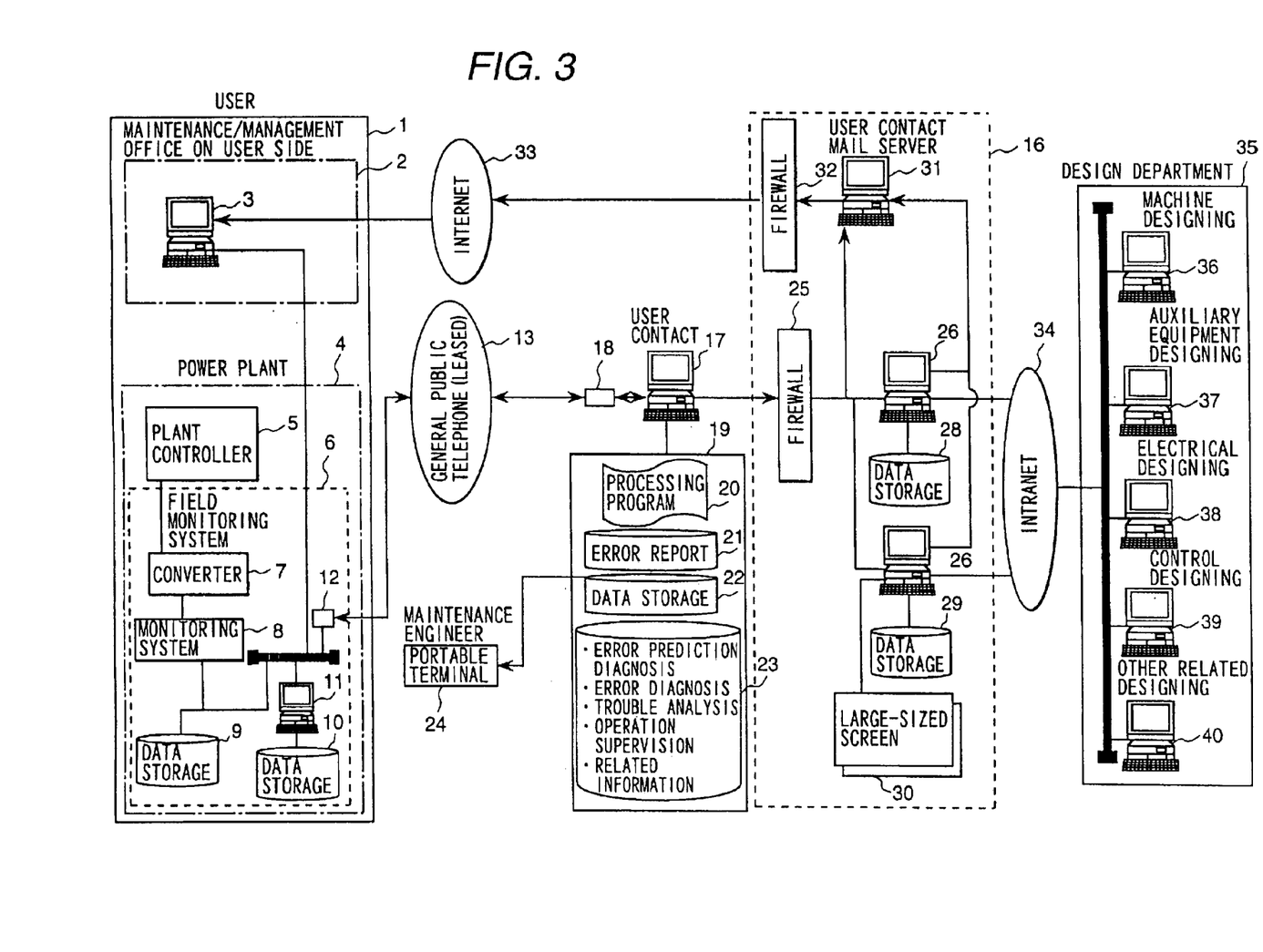
FIG. 3 is a system configuration representing a remote monitoring diagnostic system as still another embodiment of the present invention.
Figure 4:
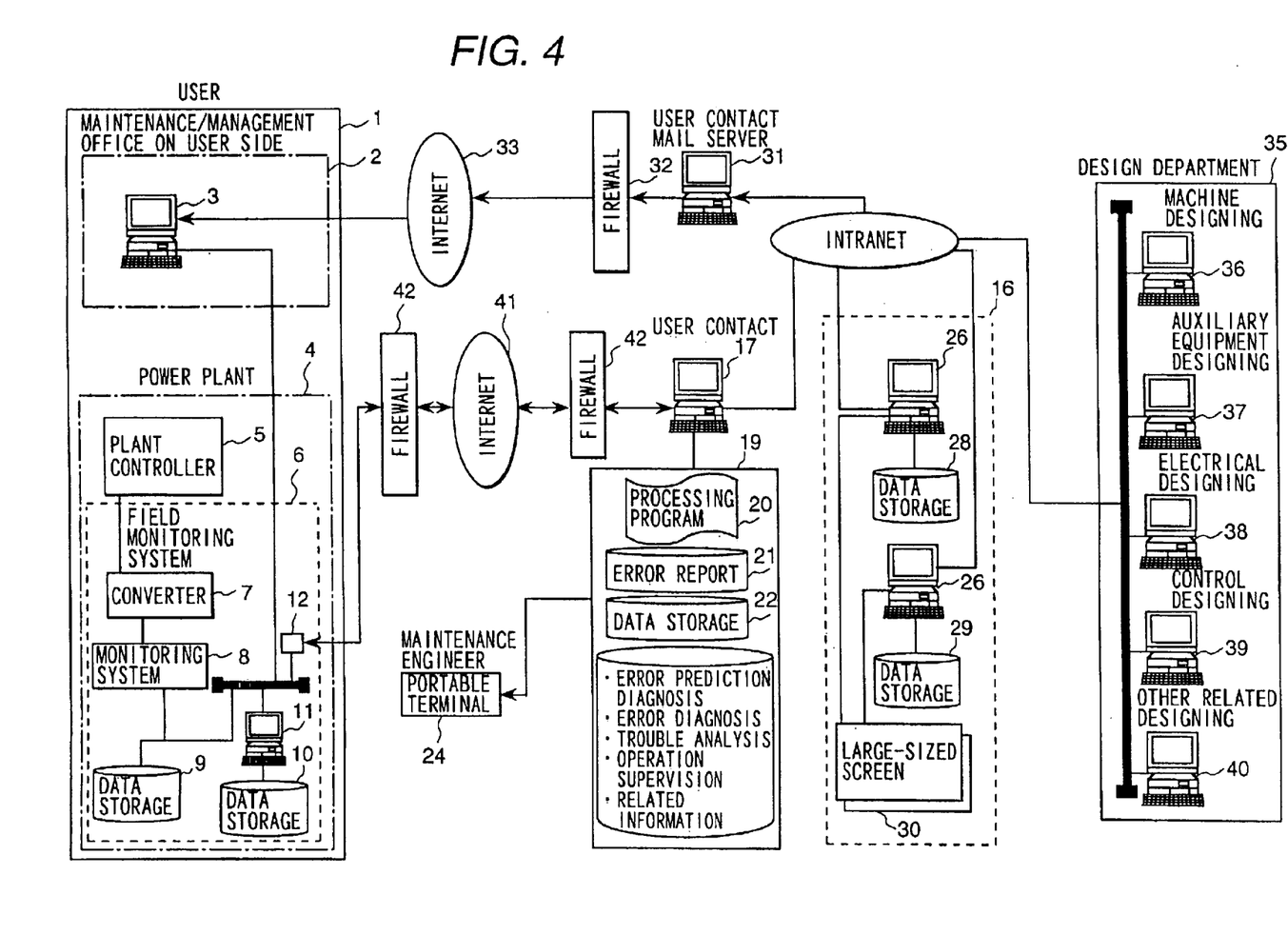
FIG. 4 is a system configuration representing a remote monitoring diagnostic system as a further embodiment of the present invention.

The following describes the embodiments according to the present invention with reference to drawings. The following embodiments use a power plant as an example of applying the remote monitoring diagnostic system according to the present invention:

FIGS. 1 to 4 show the schematic configuration of a remote monitoring diagnostic system as one embodiment of the present invention. FIGS. 1 and 2 show installation of a remote monitoring diagnostic center using the general public telephone line or Internet as a communications line means connecting between the user and manufacturer. FIGS. 3 and 4 show an example where the remote monitoring diagnostic center is installed.

The following describes the configuration given in FIG. 1 as a representative system configuration:

A personal computer 3 is installed as an terminal to permit connection with the Internet in the maintenance/management office 2 where the plant operator and maintenance personnel on the user 1 are stationed. A field monitoring system 6 to collect the plant data from the controller 5 of the power plant and to monitor the power plant is installed in the power plant 4 of the field facilities to be monitored.

This field monitoring system 6 comprises a converter 7 to convert the plant data from the power plant controller electronic data, a monitoring system 8 to collect the electronic data passing through the converter 7 and to monitor the plant status, data storage files 9 and 10 to store the collected plant data, a personal computer 11 to send the plant data collected into the data storage file 10 to the remote monitoring diagnostic center to be discussed later, and a router 12. The monitoring system 8 collects the plant data all the time, and stores the plant data on a periodic basis, for example, on the daily basis. Furthermore, when the monitoring system 8 has detected an error having occurred in the plant, it allows the plant data corresponding to the position of the error to be stored into the data storage files 9 and 10 for a specified time before and after the occurrence of an error, for example, for ten minutes. Furthermore, the data on the required plant constituting equipment is stored in the data storage files 9 and 10 when there is a request for collection of the plant data from the remote monitoring diagnostic center to be described later, independently of whether an error has occurred or not. The data stored in the data storage file 9 is sent the general public telephone line 13 through the personal computer 11 connected to permit communications with the outside of the power plant and router 12. The plant data sent from the field monitoring system 6 is sent to the remote monitoring diagnostic center 14 through the general public telephone line 13.

In the present embodiment given in FIG. 1, two data storage files are provided as the field monitoring system 6. The data storage file 9 is stored in such a way that it cannot be accessed from the outside. This is intended to ensure safety so that the plant data will not be lost. Data storage file 10 is provided to send the plant data from the personal computer 11 to the outside. Furthermore, in the present embodiment, general public telephone line 13 is used as a means of communications to the outside. The field monitoring system 6 and remote monitoring diagnostic center can be connected using the leased line.

The major constituents of the remote monitoring diagnostic center 14 are (1) a monitoring center 15 to receive the plant data sent from the power plant 4 to monitor the power plant 4, and (2) a technical center 16 to cope with the technical problem according to the plant data received from the monitoring center 15.

First, the monitoring center 15 will be described. The monitoring center 15 consists of a personal computer 17 connected with the general public telephone line 13 to permit communications through the router 18, and a monitoring system 19 on the center side to process the received the plant data. The monitoring system 19 on the center side is provided with (1) the processing program 20 to process the received plant data, (2) error report program 21 to notify the maintenance engineer of the received information on the error having occurred to the power plant 4, (3) the data storage file 22 to store the received plant data, and (4) the database 23 storing the history of diagnosis of errors having occurred to the power plant. The monitoring center is staffed by pilot members.

The error report program 21 has a function of notifying the maintenance engineer in charge of power plant maintenance regarding the following first information when it has received information on the error having occurred to the power plant; the time when the error occurred, the name of the power plant where it has occurred, and the contents of the error. In this case, if the maintenance engineer has a portable terminal 24 such as mobile equipment to receive report of the error having occurred, information can be transmitted earlier and more securely.

A data storage file 22 has a function to store the plant data sent from the field monitoring system 6. The plant data stored in the data storage file 22 is the same as the data stored in the data storage files 9 and 10 of the field monitoring system 6. As described above, the plant data corresponding to the position of an error for a specified time before and after the occurrence of the error is stored when an error has occurred to the plant. Furthermore, when there is a request to send the plant data from the remote monitoring diagnostic center to the field monitoring system 6, the requested data to be sent is stored.

When the plant data are sent from the field monitoring system 6 at all times, the data accumulated and stored is updated at every specified interval.

With the process of time, the database 23 stores the following information; (1) predictive diagnosis made according to the plant data in the normal operation mode, (2) error diagnosis to show the nature of the error according to the plant data on the occurrence of an error, (3) trouble analysis to show the reason for the error having occurred, (4) instruction to show the operation to be performed to the power plant, and other related information. As described above, when the database 19 stores the result of diagnosis made so far, a more effective diagnosis of the errors of the power plant composed of multiple pieces of equipment can be provided by accessing the database 19 whenever required.

Upon receipt of a signal for the occurrence of an error from the power plant 4, the monitoring center 15 configured in this way transmits the error event having occurred and plant data related to the error event to the technical center 16 through Firewall. Said transmission to the technical center 16 is based on the processing program loaded in monitoring system 19 on the center side. Further, pilot staff (monitor staff) are assigned to the monitoring center 15 can notify the occurrence of the error and transmits plant data to the relevant department of the technical center 16 according to the contents of the error event.

The following describes the technical center 16: The technical center 16 is provided with personal computers 26 and 27 laid out for each departments classified according to the type of the error event or the field of the product, data storage files 28 and 29 to store the plant data sent to these personal computers 26 and 27, and a large-sized screen 30 which displays that an error has occurred, indicating the details thereof. As described above, this technical center 16 consists of multiple departments, and technical staff (engineers) are assigned to each department. Only two personal computers 28 and 29 are shown in the Figure. More than two can be installed if required.

The error event and plant data are sent in the status assigned to the department in charge corresponding to the error event by pilot staff at the technical center 16 of the above-mentioned configuration. The department in charge uses the database 23, as required, to search the errors having occurred so far and diagnostic contents and diagnoses the received error event.

The result of diagnosis and information on the causes for the error and actions to be taken are sent as a reply to the personal computer 3 of the Maintenance/management office on user side 2 by electronic mail through engineer support mail server 31. This allows the actions to be taken against the error having occurred to a power plant. The personal computer 3 installed on the Maintenance/management office on user side 2 and the engineer support mail server 31 are connected to permit communications by Internet 33. The engineer support mail server 31 is connected thereto through the Firewall 32

The technical center 16 is connected with the product design department 35 to allow communications with each other through the Intranet 34. As one example, said product design department 35 consists of machine designing department 36, auxiliary equipment designing department 37, electric designing department 38, control designing department 39 and other related departments in charge 40. Whenever required, technical staff assigned to said technical center 16 uses the personal computers 26 and 27 to contact the designing department in charge of the error which has occurred.

The technical center diagnoses the result of the plant data collected independently of the error which has occurred. Based on the result of this diagnosis, it can send information on the current wear of the power plant components and power plant maintenance scheduling to the user 1. Further, it can also send the result of diagnosis on the error and maintenance scheduling to the portable terminal 24 (not illustrated) for the maintenance engineer.

Reply to the user can be given by mail from the monitoring center 15 through the engineer support mail server 31 if the monitoring center 15 is enabled to meet the requirements.

FIG. 2 shows another embodiment of the remote monitoring diagnostic system. According to this embodiment, field power plant 4 and remote monitoring diagnostic center 14 are connected with each other by the Internet 41 instead of the general public telephone line. The personal computer 11 of the field monitoring system 6 connected with the Internet 41 is connected through Firewall 42 to prevent a third party from getting the plant data by accessing the personal computer 11. Similarly, the personal computer 17 installed at the monitoring center 15 is also connected through Firewall 43 and Firewall.

FIGS. 3 and 4 show the system configuration where the remote monitoring diagnostic center 14 shown in FIGS. 1 and 2 is not installed. Since the power plant and others have complicated product configuration, the designing departments in charge are located at multiple sites in some cases. In FIGS. 1 and 2, information on the occurrence of an error and plant data are send to the designing departments in charge after collection of the plant monitor and plant data at the remote monitoring diagnostic center 14. If the designing departments in charge are centralized at one particular position, the remote monitoring diagnostic center need not be provided at a place different from the designing department in charge. Thus, according to the embodiment shown in FIG. 3, designing department 35 in charge and remote monitoring diagnostic center are located at one position.

In the system configuration shown in FIG. 3, the field monitoring system 6 and personal computer 17 as a user contact are connected with each other by the general public telephone line 13, similarly to the one shown in FIG. 1. In the system configuration shown in FIG. 4, the field monitoring system 6 and personal computer 17 as a user contact are connected with each other by the general public telephone line 13, similarly to the one shown in FIG. 2. In FIGS. 3 and 4, communication wit the user is provided from the mail server 31 of the user contact through the Firewall 32 and Internet 32.

Figure 5A:
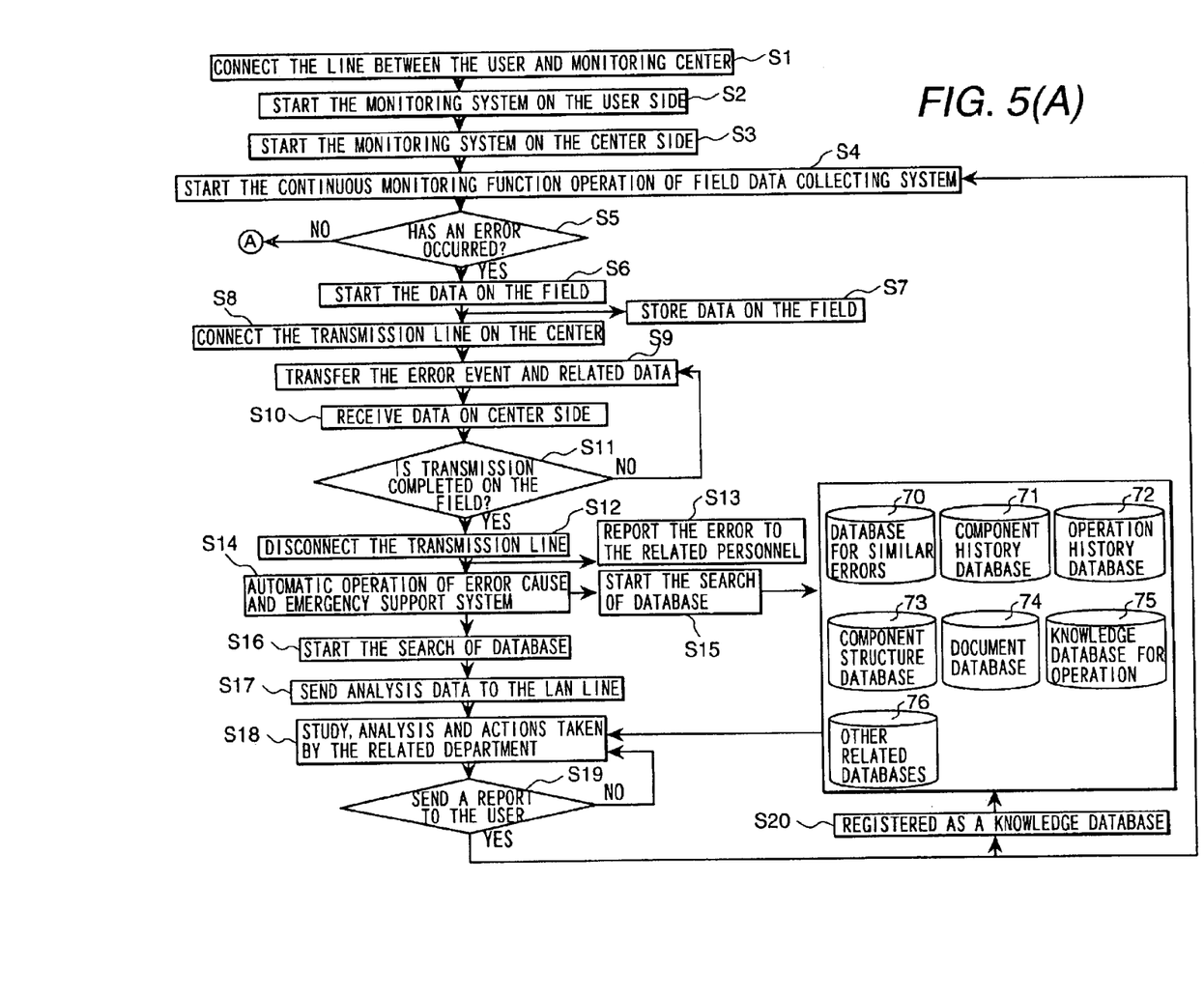
FIG. 5(A) is a flowchart representing a remote monitoring diagnostic system of the present embodiment in intermittent connection.
Figure 5B:
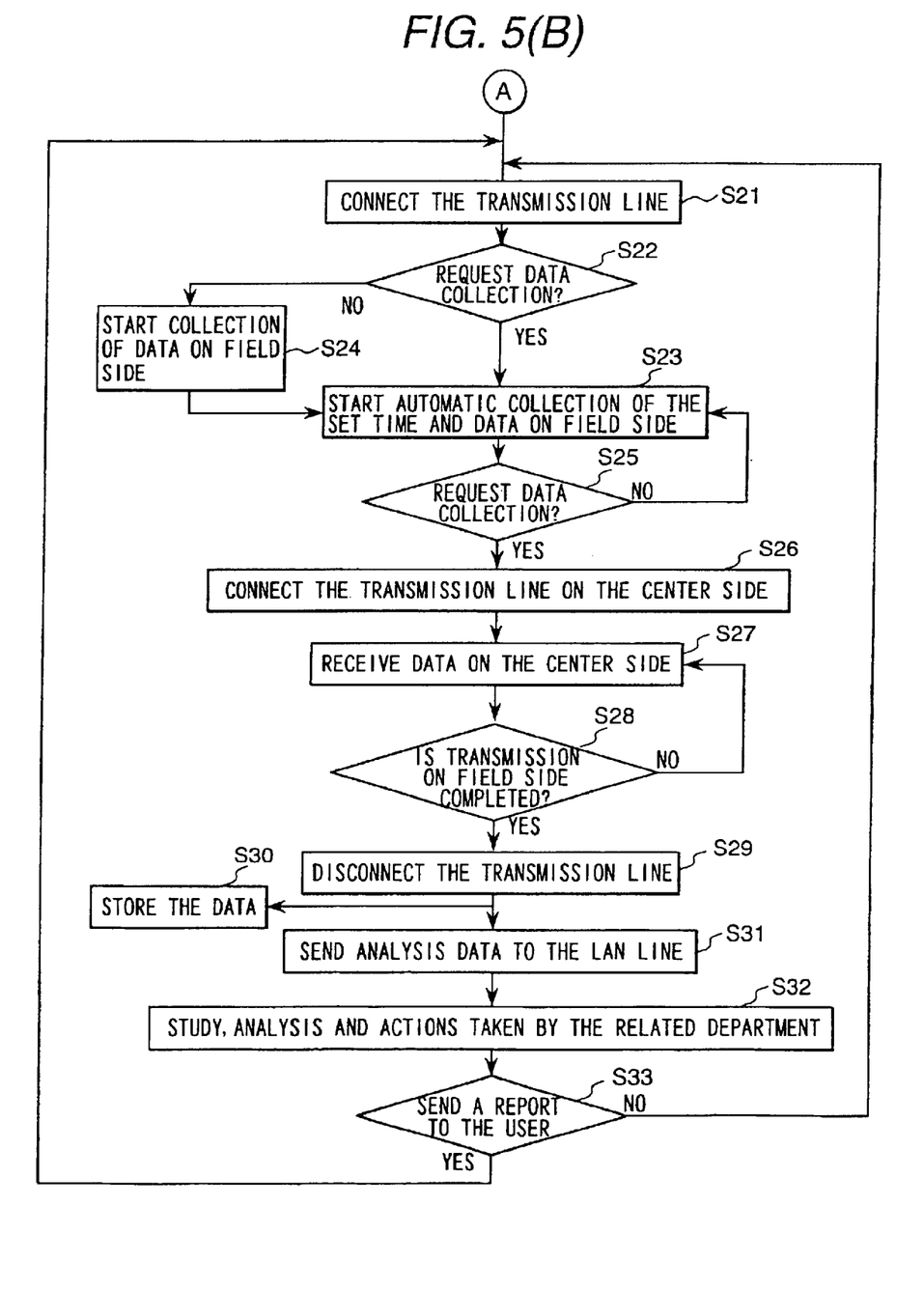
FIG. 5(B) is another flowchart representing a remote monitoring diagnostic system of the present embodiment in intermittent connection.

FIGS. 5(A) and 5(B) are flowcharts representing the remote monitoring diagnostic system according to this embodiment given in FIGS. 1 and 2. The present embodiments will be described below with reference to the system using the general public telephone line 13 as a means of communication, as shown in FIG. 1.

In the remote monitoring diagnostic system according to the present embodiment, connection between the user 1 and remote monitoring diagnostic center 14 (monitoring center) is provided by the general public telephone line 13, as shown in FIG. 5(A). The communications terminal is connected between the user and remote monitoring diagnostic center to allow communications between them (S1). The field monitoring system 6 (monitoring system on the user side) installed in the power plant 4 on the user side is started (S2), and the remote monitoring diagnostic system (monitoring system on the center side) on the side of the remote monitoring diagnostic center 14 is started (S3). Collection of the power plant data starts from this status (S4). Plant data is collected and the plant is monitored on a continuous basis by the monitoring system 8.

On field facility side where monitoring is started and the remote monitoring diagnostic center side, the sound information showing the start of plant monitoring is issued or is displayed on the display unit. The plant data collected by continuous monitoring is stored in the monitoring system 8 as discussed above.

If an error has occurred to the plant during continuous monitoring of the power plant by the field monitoring system 6 (S5), collection of the plant error data for a specified period before and after detection of an error, for example, for five minutes before and after occurrence of an error starts from the plant data stored in the monitoring system 8 (S6). Collected plant data is stored in the data storage file 10. Further, the same data as the plant data stored in the data storage file 10 is stored in the data storage file (S7).

Then the field monitoring system 6 and remote monitoring diagnostic center 14 are connected by the transmission line (S8), and the event of the error having occurred and the plant data related to the error event are transmitted to the remote monitoring diagnostic center 14 (S9). The transmitted error event and the data related to the event are received by the personal computer 17 of the monitoring center 15 (S10). If transmission of the related data from the field monitor system 6 is not completed in this case, data are again sent to the remote monitoring diagnostic center 14. If data transmission has terminated, the transmission line is disconnected (S12), and the system assumes a standby status.

Upon reception of a signal to announce the occurrence of an error to the power plant, the remote monitoring diagnostic center 14 causes the occurrence of an error to be notified to the portable terminal 24 of the maintenance engineer and personal computer 26 of the technical center 16 (S13). Further, when the monitoring center 15 has received a signal to announce the occurrence of of an error in the plant, the monitoring system 19 on the center side operates automatically, the causes for plant error are checked and emergency support is provided (S14). The monitoring system 19 on the center side searches the database 23 to find out past error diagnosis and trouble analysis (S15). The database consists of similar error database 70, component history database 71, operation history database 72, component structure data base 73, document database 74, operation knowledge database 75 and other related data base 76.

Upon receipt of a signal to announce the occurrence of a plant error, monitoring system 19 on the center side notifies the occurrence of the error and to the technical staff of the technical center 16 and sends the related plant data (S16). The technical center 16 sends the received related plant data as analysis data to the designing department 35 in charge through the LAN line (Intranet 34) (S17). Based on the transmitted analysis data, the relevant designing department in charge studies and analyzes the occurrence of an error, and takes actions (S18). Using the above-mentioned 70 to 76 types of databases, the designing department in charge evaluates and studies the occurrence of error. The result of the study is notified to the user (S19) from the mail server 31 by electronic mail. Telephone and fax can also be used for this communication. These data and replies are registered in the database as knowledge database (S20).

The following describes the plant data collection method in the normal plant operation with reference to FIG. 5(B): For example, when the plant conditions are checked and the plant data are collected for use of the maintenance schedule independently of the occurrence of the plant error, transmission line is connected (S21) first. If there is no error to the plant, request for plant data collection is issued from the remote monitoring diagnostic center 14 (S22). In the field monitoring system 6, the plant data on the requested item is collected from the plant data stored in the monitoring system 8, and are stored in the data storage files 9 and 10 (S23). If there is no request for data collection, automatic collection of the plant data is performed at preset time intervals (S24).

Upon completion of plant data collection according to the data collection request, the field monitoring system 6 is connected to the transmission line (S26). The collected plant data are sent to the remote monitoring diagnostic center 14, and plant data are received by the monitoring center 15 (S27). Upon completion of data transmission from the field monitoring system 6 (S28), the transmission line is disconnected (S29). In the monitoring center 15, the received analysis data are stored in the data storage file 22 (S30). At the same time, they are transmitted to the technical center 16 and the relevant designing department 35 in charge through the LAN line (S31). In the section where the analysis data are sent, study and analysis are made based on the data, and necessary actions are taken (S32). The result of analysis is notified to the user (S33).

The following describes the specific example of the remote monitoring and diagnostic method of the power plant using the above-mentioned remote monitoring diagnostic system. A gas turbine combustor is taken up as an example.

A trouble may occur to a gas turbine combustor regardless of how long it has been used. Causes for the trouble include a clogged combustion burner, spark plug operation failure, fuel feed pump failure and clogged fuel filter. To monitor an error monitor of the current combustor, exhaust gas temperature of the gas turbine is monitored.

According this method of monitoring the exhaust gas temperature, much time is required to locate the apparatus of the gas turbine plant to which an error has occurred, and to identify the causes when an alarm (error) has occurred. The combustor has multiple drums for one gas turbine. When an error has occurred to the combustor, it has been impossible to identify the particular one out of many combustors to which the error has occurred. Therefore, when an error has occurred to the combustor, the plant must be shut down to find out the causes. It has been required to reduce the down time due to combustor trouble.

According to the present embodiment, a thermocouple is installed for each combustor of multiple drums laid out around the gas turbine shaft, and the combustor is monitored by monitoring combustion gas temperature of each combustor.

The following describes the example of evaluating the occurrence of an error to the combustor. According to the present invention, the data on the exhaust gas temperature detected by the thermostat installed for each of the combustors are collected by the monitoring system 8 shown in FIG. 1 as described above. At the same time, errors of each combustor are monitored. The monitoring system 8 provides trend monitoring of the exhaust gas temperature data of each thermocouple. For example, data is collected in increments of one minute, and multiple combustors are monitored. When temperature difference between the two adjacent thermocouple data is greater than the specified value, an error is considered to have occurred to the combustor. When an error is found in the detection data of one of the adjacent thermocouples, an error is considered to have occurred to the thermocouple, not the combustor.

In the monitoring system 8, when the error is considered to have occurred to the combustor, the data covering a specified period before and after the occurrence of the combustor error, for example, five minutes before and after occurrence of an error are selected from the data collected in the monitoring system 8, and are stored in the data storage files 9 and 10. At the same time, a signal to announce the occurrence of an combustor error and data on the combustor error stored in the data storage file 10 are sent to the remote monitoring diagnostic center 14.

Figure 6:
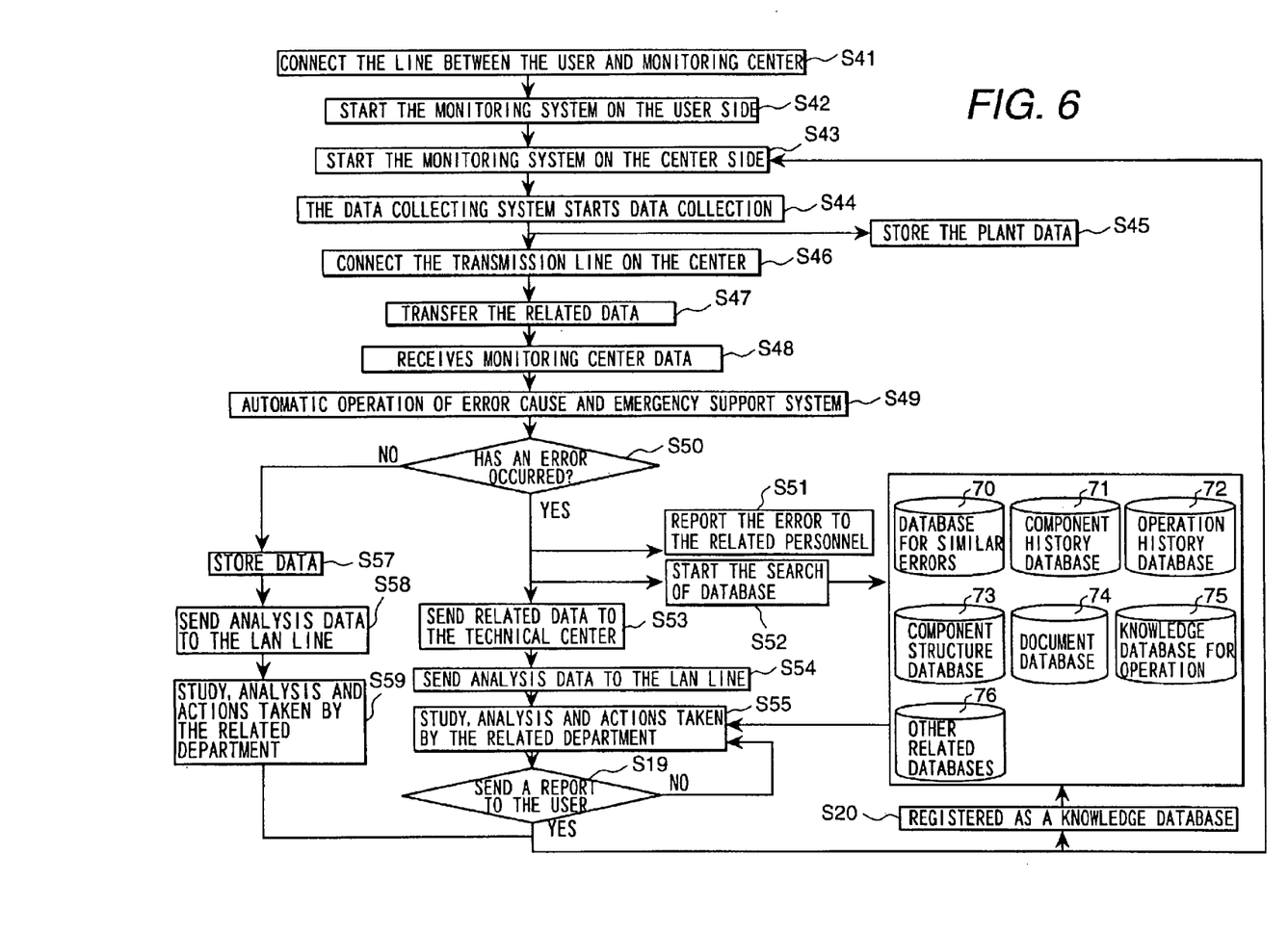
FIG. 6 is a flowchart representing a remote monitoring diagnostic system of the present embodiment in continuous monitor mode.

FIG. 6 is a flow chart wherein a communications line is used to monitor the power plant 4 and remote monitoring diagnostic center 14 at all times. The details of FIG. 6 are almost the same as those of intermittent connection given in FIGS. 5(A) and 5(B), so only the differences will be described below.

Figure 71:
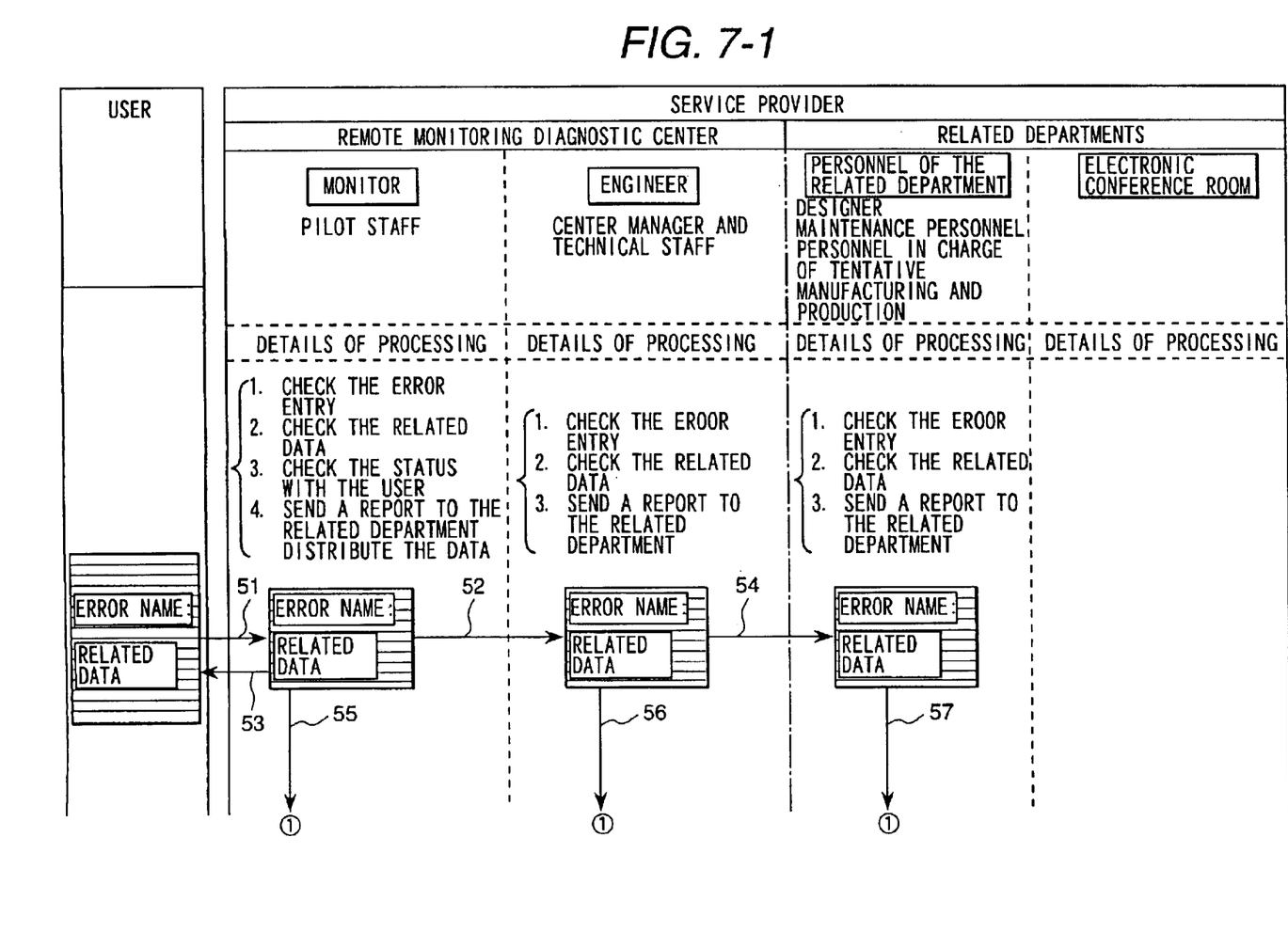
Figure 72:
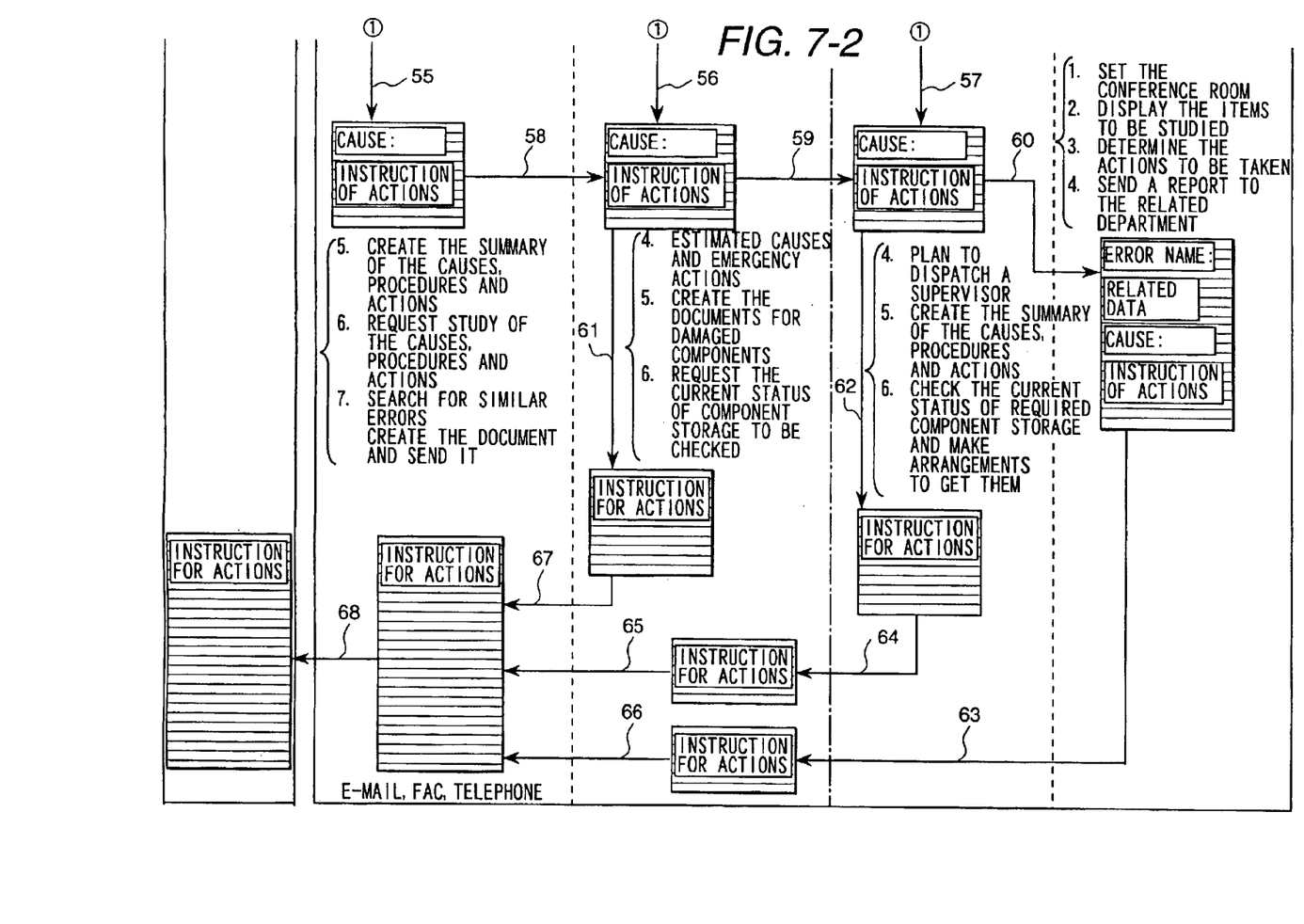

When the power plant is monitored constantly, plant data collected by the field monitoring system 6 is sent to the remote monitoring diagnostic center 14 through the general public telephone line 13. The received plant data is stored in the data storage file 22. When an error has been detected, a signal to announce the occurrence of an error and data on the occurrence of an error are sent to the technical center (S54) from the monitoring system 19 on the center side. The stored plant data are sent to the related department as analysis data (S58), if the error has not occurred. These data are used to evaluate and study the service life and performances FIGS. 7-1 and 7-2 outline the work performed by the center staff on the remote monitoring diagnostic center 14 and the related departments. The staff in the remote monitoring diagnostic center consist of engineers including pilot staff (monitor staff), center manager and technical staff 11. The product related department is staffed by product designers, maintenance personnel and manufacturing/production engineers.

When an error has occurred to the user facilities, electronic data are sent to the remote monitoring diagnostic center 14 through field monitoring system 6 (51). Pilot staff check error items and related data, confirm the status of facilities with the user (52), and send information to the related departments (53 and 54). For the errors which do not require inquiry with the related department or study (55), the remote monitoring diagnostic center creates a recipe of how to find causes and take actions, and enters it in the specified format, and sends it to the user by electronic mail (68) after getting approval of the center managers 10 of previously registered related departments (58). When the mail system is faulty or the description is unclear, by telephone or fax is also used to ensure correct communications.

Error contents are evaluated by the pilot staff, and the conditions and actions are reported to the technical center manager (52). The center manager checks the contents and fills the specified format with items requesting study by the technical staff. Then he sends it by electronic mail. If the event is such that the technical staff can find causes and take actions, said technical staff create the instruction for actions to be taken and send it by electronic mail or in the form of a letter (67). Having received the report, the pilot staff sends it to the user (68). If the technical staff cannot find causes and take actions for the error, a request is sent the department in charge of the product to study it (54). After actions to be taken have been determined by the relevant department, they are reported to technical staff (64), and are then reported to the pilot staff (65). The pilot staff sends the reply to the user (68).

When the pilot staff have received error data from the remote monitoring system and have found out that the error is wide-ranging and the study involves complicated steps, related personnel will be called to discuss at the electronic conference room (60). After actions have been determined, they are reported to the pilot staff (63 and 66).

In order to take quick actions against the error having occurred to the facilities and equipment thereby ensuring reliability for the user, and to secure a substantial improvement in the form of report of the conventional user operation or the situation by the maintenance personnel through telephone, the present embodiment provides support to ensure that multiple fields or multiple equipment are monitoring and diagnosed simultaneously through the communications line (ISDN, Internet, Intranet and video communications). Information on the operation status data of the facilities is stored in the database in electronic forms. At the same time, monitoring and diagnosis are performed on the real time basis. This brings about a substantial reduction in the amount of work done by the users and manufacturers involved in the actions and processing of the error. At the same time, the optimum error handling procedures are established for each of the facilities so that technologies can be handed down to a successor or new user.

Introduction of this system provides a substantial improvement in equipment availability factor. Simultaneous monitoring and diagnosis of multiple sites and multiple units at the Center decreases the number of persons in charge on the user and manufacturer sides. This system also allows quick actions to be taken to solve the problem.

Multiple units of composite power generating equipment consisting of a large-sized steam turbine, gas turbine and steam turbine, the diesel power generating equipment for emergency use and normal use and power cogeneration equipment are installed in the same field. In the remote area (a long distance from the power generating equipment to the maintenance group) both inside and outside Japan including isolated islands, much time is required to ensure a highly efficient operation of the facilities and to take actions against the trouble. (Unable to handle the case due to absence of the personnel with sufficient knowledge or a long physical distance).

In the remote monitoring diagnostic system according to the present embodiment, to handle the multiple pieces of power generating equipment in the same field or power generating equipment in the multiple fields, the controller interior is modified to take out the quantity of the plant statuses and all monitor information (optically selectable) with respect to the current facilities, or a new measuring instrument is installed. Information which can be monitored is converted into digitalized signals, and is transmitted through the communications line (ISDN line, Internet, Intranet, radio) to the facilities where monitor and diagnosis are conducted on a real time basis by remote control. Then the following processing is performed:

When an alarm monitored by the plant controller has occurred, it can be automatically detected simultaneously at the remote monitoring diagnostic center through the line. Analog and digital information corresponding to the alarm name is collected within the time interval optionally set before and after occurrence of the error at a desired sampling cycle. It is displayed in numerical and graphic data, and actions to be taken and estimated causes for the error are automatically indicated.

The drawings and other documents required to identify the caused for the error are displayed on the screen as electronic data by entering search information from the database stored in the host computer. Preliminary information on the component required to handle the trouble is displayed on the screen as electronic data by entering the necessary search information.

Communications of electronic data between the field monitoring system and remote monitoring diagnostic center can be performed by any of the general public telephone line 13 (ISDN line), Internet, Intranet and radio communication means.

To ensure quick handling of the trouble, cases of troubles having occurred so far are classified according to event, cause, position and place of installation and are stored in the database. Such information can be used by entering the search information. Information on new troubles can also be stored in the database for subsequent use.

To ensure that the actions to be taken in the event of a trouble and information on the estimated cause are reported to the facilities maintenance personnel, such information is classified and stored in the database. Or such information is entered into the database as knowledge data so that information can be automatically displayed on the screen in response to the trouble alarm.

Numerical and graphic information collected at the monitoring center is sent to the personnel in charge of equipment manufacturing via the Internet. The information can be supplied to the supervisor dispatched to another site through the Internet and general public telephone line. Data on the error having occurred and information on the actions are stored as database, and can be used when the same error occurs in future. Basically, these steps of processing are performed at the monitoring center.

According to the present embodiment, the user is connected to the remote monitoring diagnostic center and monitoring facilities via the communications line. When an error has occurred, automatic dial-up connection is made. During the normal operation, the normal or abnormal operation data obtained through communications tool installed on the equipment to be monitored and diagnosed can be obtained on a real time basis or off-time basis by line connection in response to the request from the center. The obtained electronic data are automatically analyzed in the Center, and the occurrence of an error is automatically reported to the department in charge, thereby reducing the time before taking the action. Further, when it is necessary to get the drawing, inspection record, previous record or past similar events in order to take actions, such information can be quickly obtained from the information database at the monitoring and diagnostic center. Information on the components and processes necessary to take actions can be easily provided by the database, and can be sent to the relevant department of the manufacturer or the user quickly by electronic mail.

Said database can also be used to check the integrity of the facilities during test after periodic inspection or termination of the plan, and to monitor errors and verify data adequacy during test operation.

To determine usability of its component and need of repair before starting repair or replacement of the equipment, treatment of the similar errors in the past and the detailed result of study by the department in charge can be used as electronic data. This makes it easy to make an overall evaluation and determination at the monitoring and diagnostic center.

The generator can be broadly classified as a prime mover, generator, auxiliary equipment and controller.

The monitoring and diagnostic center can send the obtained data and questions of the user to each specialist department via LAN, and can provide support for multiple studies by specialist departments.

The following describes the advantages for the users according to the present embodiment:

(1) Reduction of engineer dispatch costs (2) Simultaneous monitoring of multiple equipment by a smaller number of people in remote control mode (3) Automatic transmission of data to be studied in the event of an error (4) Electronic data on the causes for troubles can be employed for user education.

(5) Conversion operation data into electronic form allows easy management of operation history, thereby ensuring improved office work efficiency and minimized paper space.

(6) When an engineer is dispatched to the user in the event of an error, error information can be easily obtained even if the engineer is not present. This results in minimized handling time.

(7) An error predictive information function allows actions and related information to be furnished to the personnel in charge of the facilities before a serious error occurs. This eliminates the need of information waiting time.

(8) In the event of an error, it is possible to associate the drawing with the component to which an event has occurred. This makes it possible to prevent a wrong component from being used when an operator or user places an order for the component.

(9) The operation history of the facilities can be stored in the form of electronic data. This makes it possible to work out an accurate plan at the time of maintenance.

The present invention provides a remote monitoring diagnostic system and remote monitoring diagnostic method which improve a plant availability factor.

What is claimed is:

1. A remote monitoring diagnostic system comprising:
a data storage file used to collect an exhaust gas temperature data of a gas turbine of a power plant and to store said exhaust gas temperature data of said gas turbine,
a monitoring system to monitor a combustion status of a combustor of said gas turbine of said power plant according to said collected exhaust gas temperature data of said gas turbine,
a database storing a past combustor data of said gas turbine associated with past errors having occurred to said power plant and actions taken to cope with said past errors,
a diagnostic system to analyze said exhaust gas temperature data of said gas turbine and to diagnose an error of said combustor of said gas turbine according to said database, and
a reporting system to send a report to a user of said power plant regarding causes for the error and/or actions taken to cope with the error based on a result of said analysis.

2. A remote monitoring diagnostic system according to claim 1 characterized in that said database stores the result of said analysis of said exhaust gas temperature data of said gas turbine associated with an occurrence of errors collected by said plant monitoring system or a result of a predictive diagnosis of said exhaust gas temperature data of said gas turbine in a normal operation mode diagnosed by said monitoring and diagnostic systems.

3. A remote monitoring diagnostic system comprising:
a data storage file used to collect an exhaust gas temperature data of a gas turbine of a power plant and to store said exhaust gas temperature data of said gas turbine,
a monitoring system to monitor a combustion status of a combustor of said gas turbine according to said collected exhaust gas temperature data of said gas turbine,
a database storing a past combustor data of said gas turbine associated with past errors having occurred to said power plant and actions taken to cope with said past errors,
a diagnostic system to analyze said exhaust gas temperature data of said gas turbine and to diagnose an error of said combustor of said gas turbine according to said database, and
a reporting system to send a report to a user of said power plant regarding a maintenance plan of said combustor of said gas turbine or a deterioration status of major components based on a result of said analysis.

4. A remote monitoring diagnostic system comprising:
a monitoring system installed close to a power plant where said monitoring system is used to monitor a combustion status of a combustor of a gas turbine and to collect an exhaust gas temperature data of said gas turbine of said power plant,
a diagnostic system to analyze said combustion status of said combustor of said gas turbine and said exhaust gas temperature data sent to a remote monitoring diagnostic center located away from said power plant based on a database storing past power plant data associated with past errors having occurred to said power plant and actions taken to cope with said past errors wherein an analysis of said exhaust gas temperature data of said gas turbine sent from said monitoring system is made and an error of said combustor of said gas turbine is diagnosed; and
a reporting system to send a report to a user of said power plant regarding causes for the error and/or actions taken to cope with the error based on a result of said analysis.

5. A remote monitoring diagnostic system comprising:
a monitoring system installed in a field power plant, wherein said monitoring system is used to monitor a combustion status of a combustor of a gas turbine and to collect an exhaust gas temperature data of said gas turbine,
a plant data storage file to store said exhaust gas temperature data for a specified period of time before and after an error occurs in said combustor of said gas turbine,
a data transmitter to send said exhaust gas temperature data stored in said plant data storage file,
a data receiver connected with said data transmitter to permit communications, wherein said data receiver receives said exhaust gas temperature data of said gas turbine,
a database storing past data associated with past errors of said combustor of said gas turbine having occurred to said power plant and actions taken to cope with said past errors similar to said error, a monitoring and diagnostic system to analyze said exhaust gas temperature data of said gas turbine sent from said monitoring system based on said database, and to diagnose said error of said combustor of said gas turbine; and a reporting system to send a report to a user of said power plant regarding causes for the error and/or actions taken to cope with the error based on a result of said analysis.

6. A remote monitoring diagnostic system comprising:

a plant monitoring system on a field power plant side and a center monitoring system on a center side;

said plant monitoring system on the field power plant side including:

a field monitoring system installed in a power plant where said field monitoring system is used to monitor a combustion status of a combustor of a gas turbine and to collect an exhaust gas temperature data of said gas turbine, a plant data storage file to store said exhaust gas temperature data for a period of time before and after an error event occurs in said combustor of said gas turbine, a data transmitter for transmitting said exhaust gas temperature data and error event occurrence data stored in said plant data storage file, said center monitoring system on the center side having:

a data receiver connected with said data transmitter to permit communications, wherein said data receiver receives said exhaust gas temperature data of said gas turbine and said error event occurrence data, a database storing a past combustor data of said gas turbine associated with errors having occurred to said power plant, and a diagnostic system to diagnose said error event of said combustor of said gas turbine of the field power plant according to said past combustor data stored in said database;

wherein said center monitoring system on the center side sends said exhaust gas temperature data of said gas turbine associated with said errors event having occurred to a relevant department of multiple departments of the center side according to a type of said error event sent to said center monitoring system; and further wherein said center monitoring system is provided with a mail server to notify a user of causes for the error event and/or actions taken to cope with the error event, based on a result of diagnosis through analysis made at said center side.

7. A remote monitoring diagnostic method comprising the steps of:

monitoring a combustion status of a combustor of a gas turbine by a plant monitoring system installed in a power plant, collecting an exhaust gas temperature data of said gas turbine representing said power plant, sending information on an occurrence of an error given from said plant monitoring system, including said collected exhaust gas temperature data of said gas turbine associated with the error, to a remote monitoring and diagnostic center located away from said power plant when the error has occurred to said combustor of said gas turbine of said power plant, analyzing said exhaust gas temperature data of said gas turbine sent from said plant monitoring system at said remote monitoring and diagnostic center according to a database storing a past combustor data of said gas turbine associated with similar occurrences of past errors having occurred and actions taken to cope with said past errors, whereby said error of said combustor of said gas turbine is diagnosed, and reporting causes for the error and/or actions taken to cope with the error to a user of said power plant based on a result of said analysis.

8. A remote monitoring diagnostic method according to claim 7 wherein said database stores the result of said analysis of said exhaust gas temperature data of said gas turbine associated with occurrences of said errors collected by said plant monitoring system or a result of a predictive diagnosis of said exhaust gas temperature data of said gas turbine in a normal operation mode diagnosed by a monitoring and diagnostic system.

9. A remote monitoring diagnostic method comprising the steps of:

monitoring a combustion status of a combustor of a gas turbine by a plant monitoring system installed in a power plant, collecting an exhaust gas temperature data of said gas turbine representing said power plant, sending an exhaust gas temperature data of said gas turbine from said plant monitoring system to a monitoring and diagnostic center in response to a request from said monitoring and diagnostic center, analyzing said exhaust gas temperature data of said gas turbine sent from said plant monitoring system at said monitoring and diagnostic center according to a database storing a past combustor data of said gas turbine associated with errors having occurred and actions taken to cope with the errors, whereby a life of or a performance estimation of said combustor of said gas turbine is diagnosed; and reporting a maintenance plan of said combustor of said gas turbine or a deterioration status of major components to a user of said power plant based on said analysis.

10. A remote monitoring diagnostic method comprising the steps of:

monitoring a combustion status of a combustor of a gas turbine by a plant monitoring system installed in a power plant, collecting an exhaust gas temperature data of said gas turbine representing said power plant, storing in a plant data storage file exhaust gas temperature data for a specified period before and after an occurrence of errors collected by said plant monitoring system, and sending to a monitoring and diagnostic center said exhaust gas temperature data of said gas turbine for said specified period before and after said occurrence of said errors stored in said plant data storage file, receiving by said monitoring and diagnostic center said exhaust gas temperature data of said gas turbine, analyzing by said monitoring and diagnostic center according to said received exhaust gas temperature data of said gas turbine and according to a database storing a past exhaust gas temperature data of said gas turbine associated with past errors having occurred similar to said errors, diagnosing said combustor of said gas turbine according to a result of said analysis, and reporting an analyzed result of said diagnosis to a user.

11. A remote monitoring diagnostic system comprising:

a database or storing a data of past error occurrences of a combustor of a gas turbine and a data relating to countermeasure operations with said past error occurrences, a remote monitoring and diagnostic means for collecting an exhaust gas temperature data of said gas turbine from a field power plant and for analyzing said collected exhaust gas temperature data of said gas turbine according to said database and for diagnosing an error of said combustor of said gas turbine, and a reporting means for reporting a maintenance plan of said combustor of said gas turbine or an information relating to a deterioration status of major components to a user of said field power plant according to a result of said analysis.

12. A remote monitoring diagnostic method comprising the steps wherein:

collecting an exhaust gas temperature data of a gas turbine sent from a field power plant, analyzing a collected exhaust gas temperature data of said gas turbine to determine an error according to a database storing past phenomenon of error occurrences of a combustor of said gas turbine and a data relating to countermeasure operations with the past error occurrences, remote monitoring and diagnosing the error to determine a life of or a performance estimation of said combustor of said gas turbine, and according to a result of said diagnosis, reporting a maintenance plan of said combustor of said gas turbine or an information of a deterioration status of major components to a user of said field power plant.

* * * * *